(12) United States Patent
Lassure et al.

(10) Patent No.: US 7,835,627 B2
(45) Date of Patent: Nov. 16, 2010

(54) METHOD AND DEVICE FOR RESTORING SOUND AND PICTURES

(75) Inventors: Gaël Lassure, Saint Martin d'Heres (FR); Philippe Monnier, Villard Bonnot (FR)

(73) Assignee: STMicroelectronics S.A., Montrouge (FR)

( * ) Notice: Subject to any disclaimer, the term of this patent is extended or adjusted under 35 U.S.C. 154(b) by 1262 days.

(21) Appl. No.: 11/397,929

(22) Filed: Apr. 3, 2006

(65) Prior Publication Data

US 2006/0245732 A1    Nov. 2, 2006

(30) Foreign Application Priority Data

Apr. 4, 2005    (FR) .................................. 05 03307

(51) Int. Cl.
  *H04N 7/26*   (2006.01)
  *H04N 7/00*   (2006.01)
  *H04N 9/89*   (2006.01)

(52) U.S. Cl. ........................... 386/109; 386/95; 386/96; 386/98; 386/85; 386/116; 386/13; 386/17; 386/20; 386/26; 386/27; 386/29

(58) Field of Classification Search .................. 386/96, 386/20, 26, 27, 29, 85, 116, 13–15, 109, 386/98

See application file for complete search history.

(56) References Cited

U.S. PATENT DOCUMENTS

| | | | | |
|---|---|---|---|---|
| 3,969,756 A | * | 7/1976 | Palmer et al. .................. | 386/25 |
| 4,468,709 A | * | 8/1984 | Kenjyo ......................... | 386/15 |
| 4,590,522 A | * | 5/1986 | Takemoto et al. ............. | 386/14 |
| 4,901,159 A | * | 2/1990 | Hitotsumachi ................ | 386/28 |
| 5,952,596 A | * | 9/1999 | Kondo .......................... | 84/605 |
| 6,181,383 B1 | * | 1/2001 | Fox et al. ..................... | 348/515 |
| 6,333,763 B1 | * | 12/2001 | Tanaka ........................ | 348/484 |
| 2004/0047619 A1 | * | 3/2004 | Fujiwara ..................... | 386/126 |

FOREIGN PATENT DOCUMENTS

EP          0 532 310 B1    5/1997

* cited by examiner

*Primary Examiner*—Thai Tran
*Assistant Examiner*—Helen Shibru
(74) *Attorney, Agent, or Firm*—Lisa K. Jorgenson; Timothy L. Boller; Seed IP Law Group PLLC

(57) ABSTRACT

An embodiment improves the quality of sound rendition during restitution of sound and picture originating from a source signal exhibiting temporal drift. To restore the sound and the pictures at a selected fixed picture rate, a picture sequence is calculated at the selected rate on the basis of the pictures of the source signal, and the sound of the source signal is sampled so as to obtain a sampled sound signal having a selected number of sound samples per picture of the source signal. The calculated picture sequence and the sampled sound signal are restored in a manner synchronized with the reception of the source signal. The sampled sound signal is restored without a change of pitch, with an adjustment of timing as a function of the ratio between the selected picture rate and the variable picture rate.

21 Claims, 5 Drawing Sheets

METHOD AND DEVICE FOR RESTORING SOUND AND PICTURES

BACKGROUND OF THE INVENTION

1. Field of the Invention

The disclosure pertains to video reproduction devices and more particularly, to systems and methods for improving the sound of an audio/video signal whose picture frequency fluctuates.

2. Description of the Related Art

Analog video cassette recorders are film recording and reproduction appliances that are widely used at present. A problem with video cassette recorders stems from the control of the running speed of the magnetic tape which may vary by +/−10%. With a new video recorder and a magnetic tape in good condition, the range of variation is not as big and the variations compensate for one another over the duration of a film. When the video recorder is worn and/or the tape is damaged (too old), the range of variation increases and the variations may no longer compensate for one another. Such a variation in speed slows down or accelerates the picture rate and the sound band. While viewing, the drift of the picture is righted through line and frame synchronization information. If the drift of the band is too big, the picture may "jump", that is to say from time to time a picture is lost or doubled up. The sound rate is also slowed down or accelerated, thereby decreasing or increasing the sound frequency. Moreover, the fluctuation in the running speed causes a phenomenon of "wow" on the sound, which is rather unpleasant to the ear.

Analog video recorders are products approaching the end of their life. They are currently being replaced with digital players/recorders. Digital players/recorders have the particular feature of storing the sound and the pictures in the form of coded digital data allowing superior sound and picture quality to that of analog video recorders while ensuring constant quality of reproduction independent of wear to the medium and/or the player.

BRIEF SUMMARY OF THE INVENTION

An embodiment of the invention improves the sound signal during playback carried out simultaneously with recording from an audio/video source that may include time drift. More generally, an embodiment of the invention improves the quality of sound rendition during restitution of sound and picture originating from a source signal exhibiting temporal drift.

An embodiment of the invention proposes a method of restoring sound and pictures at a selected picture rate, comprising the steps of:

receiving a source signal having sound and pictures at a variable picture rate;

calculating a sequence of pictures at the selected picture rate on the basis of the pictures of the source signal;

sampling the sound of the source signal so as to obtain a sampled sound signal having a selected number of sound samples per picture of the source signal; and restoring the calculated picture sequence and the sampled sound signal, in a manner synchronized with the reception of the source signal.

According to an embodiment of the invention, the sampled sound signal is restored substantially without any change of pitch, with an adjustment of timing as a function of the ratio between the selected picture rate and the variable picture rate.

By modifying the timing of the sound restored in DLT mode, it is possible to adapt it to the restitution tempo imposed by the source, without audibly affecting the spectrum of the signal. The ear of the user, who wants to verify in real time the quality of the recording that he is making, is generally much less sensitive to (limited) variations in the sound restitution timing than to variations in pitch.

Various techniques of timing modification not affecting the pitch of the sound signal are well known in the field of audio signal processing, and are applicable in the method according to an embodiment of the invention.

In an embodiment, the timing adjustment comprises the steps of chopping the sampled sound signal into sequences of given length, modifying each sequence so as to lengthen it or shorten it in such a way that the length ratio between the modified sequence and the sequence of given length is equal to the ratio between the selected picture rate and the variable picture rate, assembling an output sound signal on the basis of the modified sequences.

The lengthening of a sequence of given length comprises the copying of a part of the said sequence at the end of the sequence, and the shortening of a sequence comprises the deletion of a part of the said sequence. The assembling of the output sound signal then comprises a progressive mixing of two adjacent modified sequences.

As a variant, the modifying of a sequence of given length comprises the steps of carrying out a Fourier transform of the said sequence to obtain a transformed sequence, and carrying out an inverse Fourier transform of the transformed sequence over a duration corresponding to the duration of the modified sequence so as to obtain the modified sequence. The assembling of the output sound signal comprises a progressive mixing of two adjacent modified sequences.

According to a second aspect, an embodiment of the invention proposes a device improving the quality of the signal originating from a source signal exhibiting time drift. An embodiment of the device for restoring sound and pictures at a selected picture rate comprises:

means for receiving a source signal having sound and pictures at a variable picture rate;

means for calculating pictures so as to produce a sequence of pictures at the selected picture rate on the basis of the pictures of the source signal;

means for sampling the sound of the source signal so as to obtain a sampled sound signal having a selected number of sound samples per picture of the source signal;

means for restoring the calculated picture sequence and the sampled sound signal, in a manner synchronized with the reception of the source signal; and means of timing adjustment so that the sampled sound signal is restored substantially without any change of pitch, with a timing adjusted as a function of the ratio between the selected picture rate and the variable picture rate.

Another aspect pertains to a digital video player/recorder comprising:

means for receiving a source signal having sound and pictures at a variable picture rate;

means for calculating pictures so as to produce a sequence of pictures at the selected picture rate on the basis of the pictures of the source signal;

means for sampling the sound of the source signal so as to obtain a sampled sound signal having a selected number of sound samples per picture of the source signal;

means of recording the calculated picture sequence and the sampled sound signal on a digital recording medium;

means of audio and video restitution, that can be activated in a simultaneous recording and restitution mode so as to restore the calculated picture sequence and the sampled sound signal in a manner synchronized with the reception of the source signal; and means of timing adjustment, activated in the simultaneous recording and restitution mode so that the sampled sound signal is restored substantially without any change of pitch, with a timing adjusted as a function of the ratio between the selected picture rate and the variable picture rate.

The digital recording medium may comprise, for example, an optical disk, DVD, magnetic disk, hard disk, magnetic tape, non-volatile electronic memory, etc.

In one embodiment, a method of restoring sound and pictures at a selected picture rate comprises the steps of: receiving a source signal having sound and pictures at a variable picture rate; calculating a sequence of pictures at the selected picture rate based on the pictures of the source signal; sampling the sound of the source signal so as to obtain a sampled sound signal having a selected number of sound samples per picture of the source signal; and restoring the calculated picture sequence and the sampled sound signal, in a manner synchronized with the reception of the source signal, wherein the sampled sound signal is restored substantially without change of pitch, with an adjustment of timing as a function of the ratio between the selected picture rate and the variable picture rate.

In one embodiment, the calculated picture sequence is restored by selectively deleting or repeating certain pictures of the said sequence, the deletion or repetition being controlled as a function of the ratio between the selected picture rate and the variable picture rate, with an interpolation between successive pictures. In one embodiment, the picture sequence and the sampled sound signal are recorded on a digital recording medium during their synchronized restitution. In one embodiment, the timing adjustment comprises the steps of: chopping the sampled sound signal into sequences of given length; modifying the length of each sequence so that a ratio between the modified sequence length and the sequence of given length is substantially equal to a ratio between the selected picture rate and the variable picture rate; and assembling an output sound signal on the basis of the modified sequences.

In one embodiment, modifying the length of a sequence of given length comprises a copying of a part of said sequence at the end of the sequence and the assembling of the output sound signal comprises a progressive mixing of two adjacent modified sequences. In one embodiment, modifying the length of a sequence of given length comprises a deletion of a part of the sequence and the assembling of the output sound signal comprises a progressive mixing of two adjacent modified sequences. In one embodiment, modifying a sequence of given length comprises the steps of: carrying out a Fourier transform of said sequence to obtain a transformed sequence; and carrying out an inverse Fourier transform of the transformed sequence over a duration corresponding to a duration of the modified sequence so as to obtain the modified sequence; wherein the assembling of the output sound signal comprises a progressive mixing of two adjacent modified sequences.

In one embodiment, a device for restoring sound and pictures at a selected picture rate comprises: means for receiving a source signal having sound and pictures at a variable picture rate; means for calculating pictures so as to produce a sequence of pictures at the selected picture rate on the basis of the pictures of the source signal; means for sampling the sound of the source signal so as to obtain a sampled sound signal having a selected number of sound samples per picture of the source signal; means for restoring the calculated picture sequence and the sampled sound signal, in a manner synchronized with the reception of the source signal; and means of timing adjustment so that the sampled sound signal is restored substantially without change of pitch, with a timing adjusted as a function of the ratio between the selected picture rate and the variable picture rate.

In one embodiment, a digital video player/recorder comprises: means for receiving a source signal having sound and pictures at a variable picture rate; means for calculating pictures so as to produce a sequence of pictures at the selected picture rate on the basis of the pictures of the source signal; means for sampling the sound of the source signal so as to obtain a sampled sound signal having a selected number of sound samples per picture of the source signal; means of recording the calculated picture sequence and the sampled sound signal on a digital recording medium; means of audio and video restitution, that can be activated in a simultaneous recording and restitution mode so as to restore the calculated picture sequence and the sampled sound signal in a manner synchronized with the reception of the source signal; and means of timing adjustment activated in the simultaneous recording and restitution mode so that the sampled sound signal is restored substantially without change of pitch, with a timing adjusted as a function of the ratio between the selected picture rate and the variable picture rate. In one embodiment, the means of audio/video restitution comprises: a chopper; a length modifier; and a combiner.

In one embodiment, a method of modifying a signal comprises: receiving an audio-visual signal having a variable picture rate; generating a sequence of video images at a selected picture rate from the received audio-visual signal; sampling the received audio-visual signal so as to obtain a sampled sound signal; chopping the sampled sound signal into sequences of a selected length; and modifying the length of a first sequence of the sequences of a selected length to obtain a first modified sequence, wherein a ratio between the first modified sequence length and the selected length is approximately equal to a ratio between the selected picture rate and the variable picture rate. In one embodiment, modifying the length of the first sequence comprises: copying a portion of the first sequence at an end of the sequence; applying an attenuating function to the end of the first sequence; applying a complementary attenuating function to an end of copied portion of the first sequence; and progressively mixing the first sequence and the copied portion of the first sequence. In one embodiment, modifying the length of the first sequence comprises: deleting a portion of the first sequence at an end of the first sequence. In one embodiment, modifying the length of the first sequence comprises: carrying out a Fourier transform of the first sequence to obtain a transformed sequence; and carrying out an inverse Fourier transform of the transformed sequence over a duration corresponding to a duration of the first modified sequence so as to obtain the first modified sequence. In one embodiment, the method further comprises: modifying the length of a second sequence of the sequences of a selected length to obtain a second modified sequence; and progressively mixing the first and second modified sequences. In one embodiment, progressively mixing the first and second modified sequences comprises: applying an attenuating function to an end of the first modified sequence; and applying a complementary attenuating function to an end of the second modified sequence.

In one embodiment, a video player comprises: an analog-to-digital converter; a shaper communicatively coupled to the analog-to-digital converter and comprising: a picture processor; and a sound processor having: a sequence chopper; a sequence length modifier; and a modified sequence combiner. In one embodiment, the video player further comprises: an encoder communicatively coupled to the analog-to-digital converter; a digital storage device communicatively coupled to the encoder; and a decoder communicatively coupled to the digital storage device and to the shaper. In one embodiment, the video player further comprises: a controller coupled to the analog-to-digital converter and to the shaper and configured to generate control signals to control the sound processor.

DETAILED DESCRIPTION OF THE INVENTION

Figure 1:
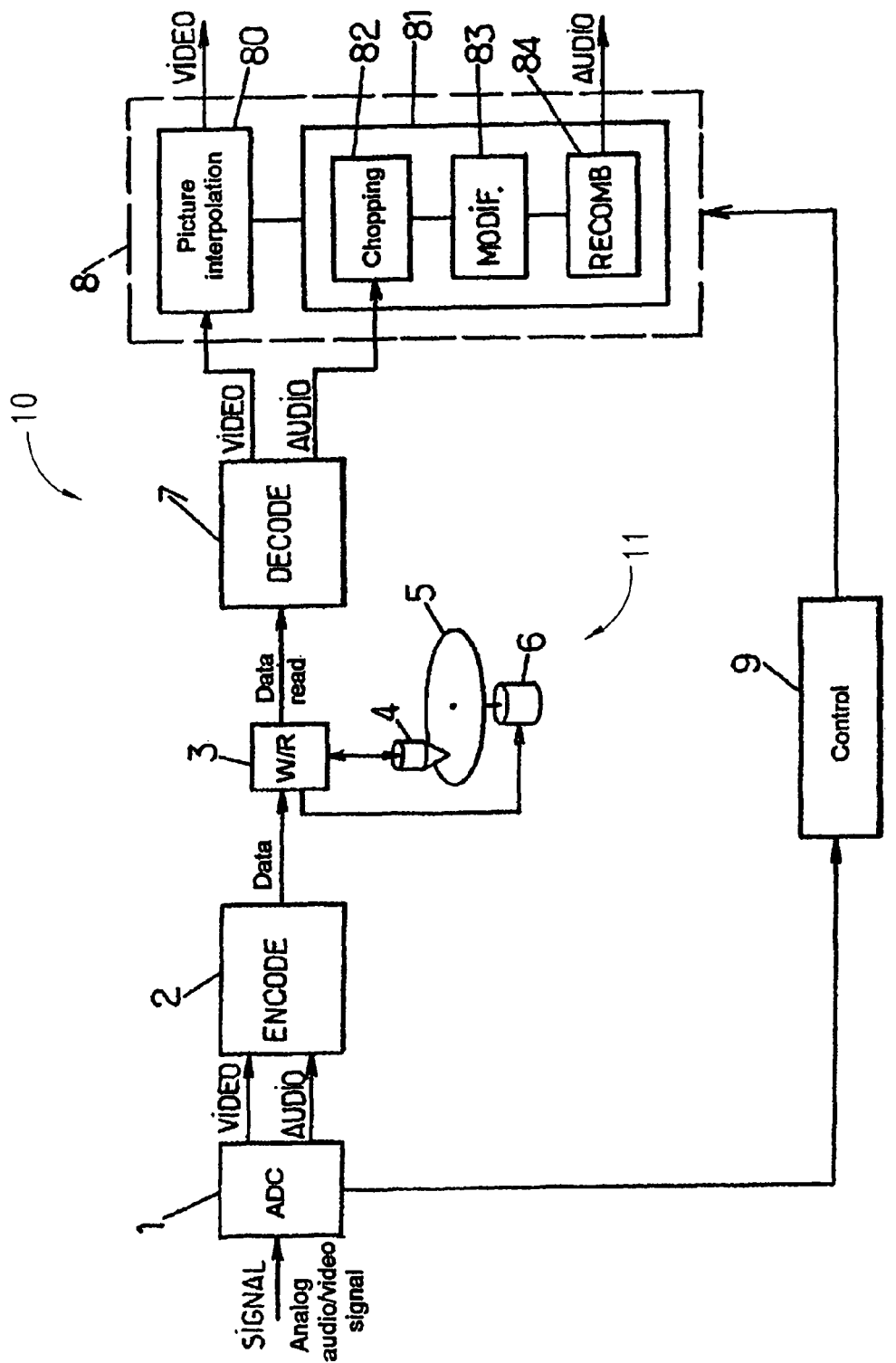
FIG. 1 represents a digital player/recorder according to an embodiment of the invention.

Although of inferior quality to a digital recording, certain films, in particular family films, will in due course be transferred from a video recorder magnetic tape to a digital medium so that they can be watched in the future. During the digital coding of a film originating from an analog medium, it is possible to improve it. The fluctuations in runout of the magnetic tape are in particular compensated so as to improve the quality of the sound and of the picture.

It is known in particular to digitize the pictures by using the line and frame synchronizations present on the tape to synchronize the sampling. Thus, the pictures are all digitized independently of the running speed of the magnetic tape. During reproduction, playback always occurs at the right picture rate.

The sound is sampled at the reproduction frequency, which is for example 48 KHz for a DVD. Next, a correction is carried out so as to compensate for the drift in the speed of the magnetic tape by using the synchronization of the pictures to compensate for the drift. An over- or under-sampling is carried out after receipt of each picture so as to bring the number of sound samples per picture to a selected value, for example 960 samples per picture for frames clocked at 50 Hz. During reproduction at normal speed, the sound is improved with respect to the playing of the analog recording.

A problem arises however if one wishes to view the digital film while recording. This mode, called DLT ("Digital Loop Through"), allows the user to control in real time the quality of the digital signal saved. Viewing is done at a selected picture rate, typically 50 or 60 Hz depending on the country, as in the subsequent viewings. To avoid excessive temporal drift between the pictures produced by the analog video recorder and the pictures displayed in DLT mode, a digitized picture is deleted from time to time (when the instantaneous speed of the video recorder is too high), or repeated from time to time (when the instantaneous speed of the video recorder is too low). This deletion/repetition process is controlled with the aid of the line and frame synchronization information, as in a video recorder.

A known improvement consists in extrapolating the pictures with motion correction. Thus, the phenomenon of picture jump is less noticeable. The quality of the sequence of recalculated pictures is better than at the output of a video recorder. However, there is no similar solution making it possible to obtain a synchronized sound of better quality than that provided by the video recorder.

The sound must be restored while preserving its synchronization with respect to the display of the pictures. The same deletion/repetition process pinned on the line and frame synchronization information cannot be applied to the sound without causing clearly audible noise.

One is then led to change the sampling frequency for the restitution in DLT mode of the digital sound recorded. The drawback of this solution is that the sound is restored with the same distortion as on the magnetic tape. The user cannot perform the desired control.

FIG. 1 represents a digital player/recorder 10. By way of example, the data recording medium or support is an optical disk 5 of DVD type. However, the recording support may be replaced with some other type of optical disk or else any other type of digital data support or medium such as a magnetic disk, for example a hard disk, or else a magnetic tape or a non-volatile electronic memory, for example of flash memory type.

The player recorder comprises:

an analog signal input receiving an analog audio/video signal;

an analog/digital conversion circuit or converter 1 transforming the audio/video analog signal into a digital video signal and into a digital audio signal;

an encoding circuit or encoder 2 receiving the digital audio and video signals so as to transform them into digital data stream to be recorded;

a read/write circuit or module 3 receiving the data stream to be recorded and providing a stream of read data, the read/write circuit 3 being linked to a read/write head 4 so as to read and/or write data on the optical disk 5, and also being linked to a motor 6 which controls the speed of rotation of the disk 5;

a decoding circuit or decoder 7 receiving the data stream read so as to transform it into a digital video signal and a digital audio signal;

a shaping circuit or shaper 8 receiving the digital audio and video signals and transforming them into analog audio and video signals provided on two outputs destined for an audio amplification chain and for a viewing device, and a control circuit or synchronizer 9 assisting the synchronization of the shaping circuit 8 with the aid of information originating from the analog/digital conversion circuit 1 during reproduction performed while recording.

The analog/digital conversion circuit 1 receives the analog audio/video signal which may include a time drift related for example to a source of analog video recorder type. The analog/digital conversion circuit 1 moreover facilitates compensation for the time drift of the source signal.

The various circuits or modules of the digital player/record 10 may be implemented in a variety of ways, including as combined systems or as separate systems. The various circuits or modules may be implemented as one or more microprocessors, digital signal processors (DSP), application-specific integrated circuits (ASIC), or the like, or as a series of instructions stored in a memory and executed by a controller, or various combinations of the above. Thus, software modifications to existing hardware may allow the implementation of the digital player/recorder 10. Various subsystems, such as shaping circuit or module 8, are identified as separate blocks in the functional block diagram of FIG. 1 because they perform specific functions that will be described in more detail below. These subsystems may be discrete units. For example, the shaping circuit or module 8 may be implemented with a discrete circuit. The subsystems also may not be discrete units but may be functions of a software routine, which will probably, but not necessarily, be separately callable and hence identifiable elements. The various subsystems may be combined. For example, all or portions of the chopping circuit or module 82 may be integrated into the modification circuit or module 83.

Figure 2:
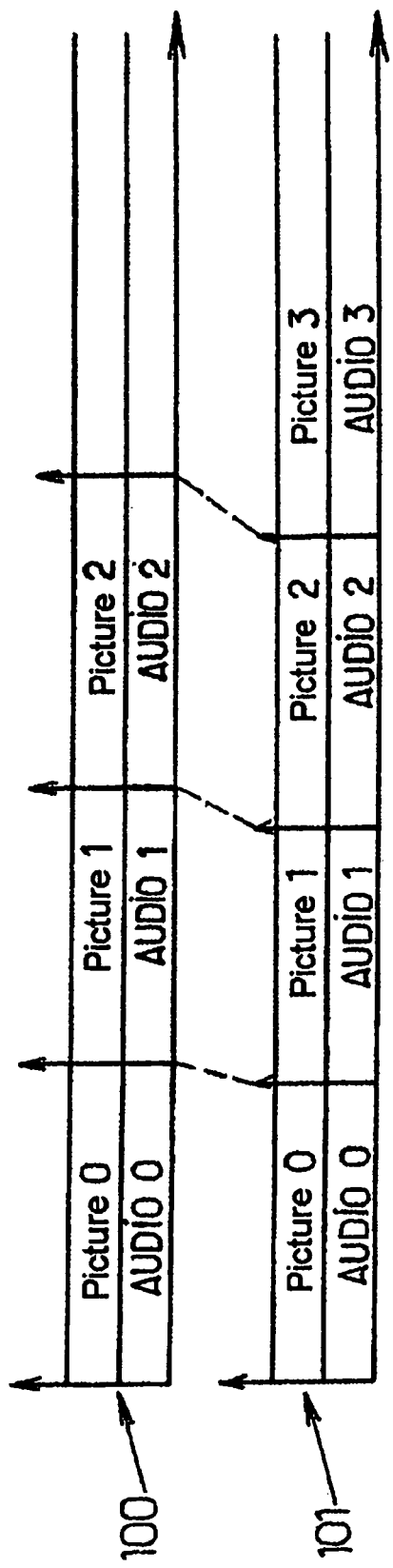
FIGS. 2 and 3 illustrate example temporal distortions of analog signal compensated so as to be recorded on a digital medium.
Figure 3:
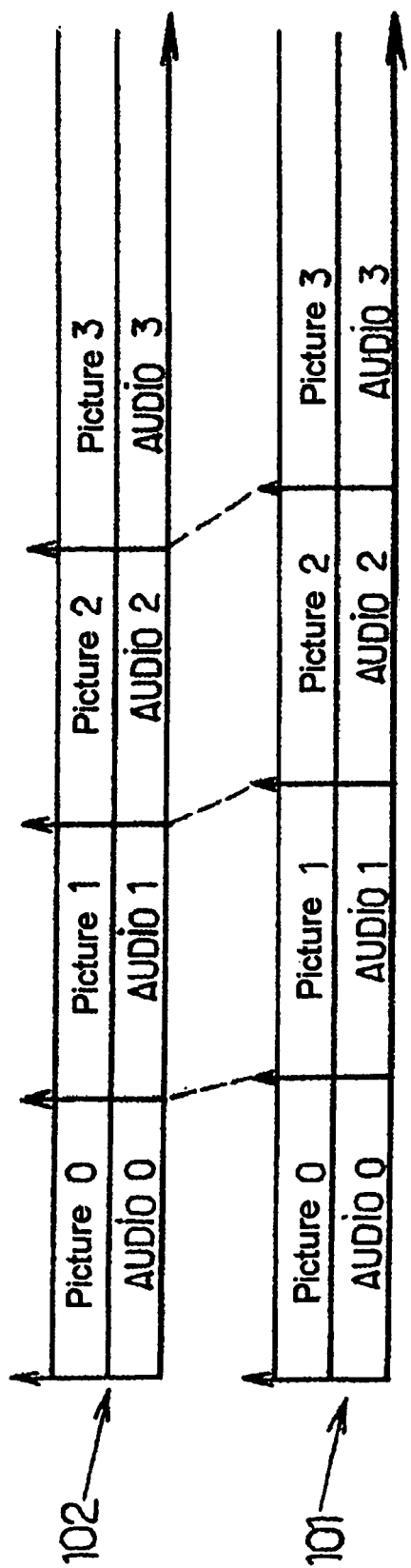

The time drift of the source signal may be positive or negative. FIG. 2 illustrates an example audio/video signal 100 slowed down with respect to an ideally synchronized audio/video signal 101. FIG. 3 illustrates an example audio/video signal 102 accelerated with respect to the ideally synchronized audio/video signal 101. In both cases, the duration corresponding to a picture, a picture line, a pixel or to a sound portion associated with a picture is found to be longer or shorter than for the ideal audio/video signal 101.

By way of example, the analog audio/video signal is a PAL (or NTSC) type signal. The signal comprises line, frame and picture synchronization information. A picture comprises two frames and 625 lines in PAL (or 525 lines in NTSC). The audio signal is mixed with the video signal and undergoes the same temporal deformation as the video.

To digitize the sound and the pictures, a separation of the video signal and of the audio signal is carried out. For the video, the line frequency is measured for each line, this measurement being calculated on the basis of the line synchronization pulses. On the basis of the line frequency, a pixel sampling frequency is calculated by multiplying the line frequency by the number of pixels in a line, for example 352. The video signal is then sampled at the sampling frequency to obtain a data stream representing pixels, for example in RGB components on 24 bits. The line, frame and picture synchronization signals are recovered and incorporated into the stream of pixel data to synchronize the pixels so as to obtain a digital video signal.

For the sound, the audio signal is sampled at a selected frequency, for example the sampling frequency of a DVD, for example 48 kHz. The circuit 1 counts the samples of sound between two successive video frame synchronization queues. During the reproduction of the video sequence from the disk, the frequency of the frames becomes a selected frequency of for example 50 Hz. To preserve synchronization between the sound and the pictures, the number of samples per frame or picture may be kept constant, for example 960 samples per frame or 1920 samples per picture (for a sampling frequency of 48 kHz and a frame frequency of 50 Hz). As a function of the ratio between the number of samples counted for a frame or picture and this constant number, an oversampling or an undersampling of the audio signal is carried out to obtain the desired number of samples.

Another possibility of sampling the sound may consist in slaving the sampling frequency to the measured line frequency. Such sampling also facilitates obtaining the desired number of samples per frame in the presence of a time drift of the analog audio/video signal.

The sound samples are grouped together into data packets, each packet corresponding to a video frame. The whole set of data packets constitutes a digital audio signal. The synchronization between the digital audio signal and the digital video signal is carried out by identifying the corresponding frames.

The encoding circuit 2 receives the digital audio and video signals and carries out a compression and a formatting of data, for example, according to a known standard such as for example MPEG2. However, it is entirely conceivable to use some other formatting standards such as for example MPEG4 or DIVX. After the compression and formatting of the data, a data stream to be recorded is provided to the read/write circuit 3.

The read/write circuit 3 serves to write and read data on the DVD disk 5. For this purpose, the circuit 3 controls and commands the positioning of the read head 4 and the speed of the motor 6. The read/write circuit 3 controls the writes and the reads of data on the disk 5 according to any suitable technique. The digital storage assembly 11 comprising the read/write circuit 3, the read head 4, the disk 5 and the motor 6 may be dimensioned so as to perform read and write operations more rapidly than the nominal read and/or write speed so as to be able to perform a write of a data packet followed by the reading of this same data packet with a data rate such that these two operations are performed in real time.

The decoding circuit 7 receives from the read/write circuit 3 the data stream read and carries out the deformatting and the decompression of the data according to the standard used by the encoding circuit 2. After the deformatting and decompression of the data, the decoding circuit 7 provides a digital video signal and a digital audio signal, the two digital signals being synchronized with one another with the aid of the information marking the ends and/or starts of video frames.

The shaping circuit 8 receives the digital audio and video signals and transforms them into audio and video analog output signals destined, for example, for a Hi-Fi chain in the case of the audio signal and for a television in the case of the video. During a straightforward reading of a DVD disk, the digital audio and video signals have a rate corresponding to the picture rate required at output. The shaping circuit 8 performs a conversion from digital to analog of the signals, according to any suitable technique.

In DLT mode, reading and writing are performed in parallel. The rate of data read corresponds to the write data rate. The shaping circuit 8 performs the conversion of the audio and video signals while compensating for them. For this purpose, the shaping circuit 8 comprises a picture processing circuit or processor 80 and a sound processing circuit or processor 81. The sound processing circuit 81 comprises a chopping circuit or module 82, a modification circuit or module 83 and a recombination circuit or module 84.

Figure 4:
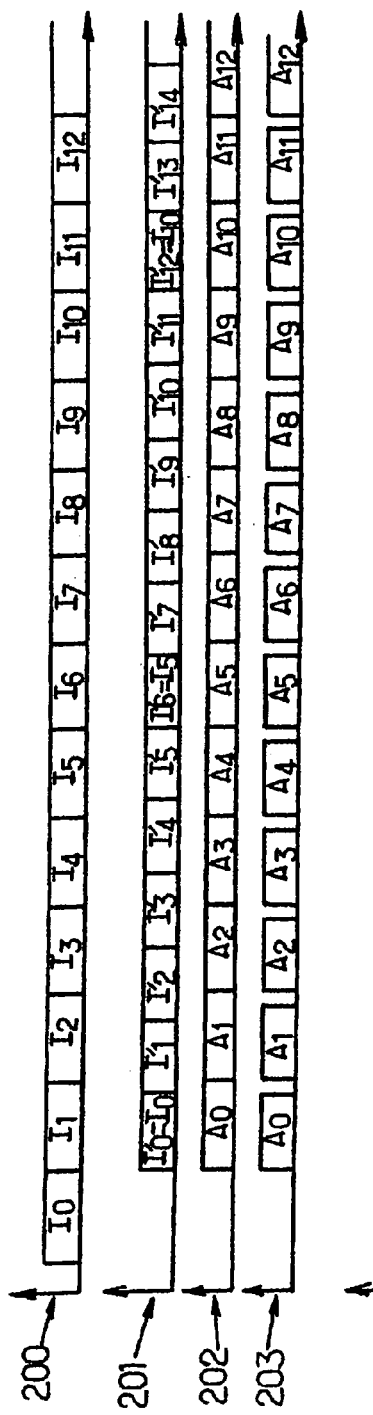
FIGS. 4 and 5 illustrate an example of the reproduction of the video and audio signals at a selected picture rate on the basis of a source signal at a variable picture rate.

FIG. 4 shows example time charts corresponding to a data read carried out with a lower rate than the rate of pictures to be restored. Stated otherwise, the signal of the analog source is slowed down a little over the period considered.

The signal 200 corresponds to the digital video signal received by the shaping circuit 8 at the same tempo as the analog signal. The pictures $I_0$ to $I_{12}$ follow one another at a lower picture rate than the nominal picture rate. The signal 201 corresponds to the analog output signal, the frames $I'_0$ to $I'_{14}$ follow one another at the nominal picture rate which corresponds for example to 50 frames per second. In the figure, the ratio between the rate of pictures read and the rate of pictures viewed is exaggerated so as to better depict the phenomenon.

In the case of FIG. 4, the pictures $I_5$, $I_{10}$, . . . are repeated so as to take account of the overly slow rate of the source. To avoid jumps in the video signal restored, an interpolation is performed by the circuit 80. Each picture $I'_i$ is interpolated on the basis of two successive pictures $I_j$ and $I_{j+1}$ which correspond to the picture which precedes and to that which follows the picture $I'_i$. The picture processing causes a delay of the frames $I'_i$ with respect to the frames $I_j$. The delay is represented as equal to a frame but may be of the order of several frames. In FIG. 4, the frames $I'_0$, $I'_6$, $I'_{12}$, . . . correspond respectively to the frames $I_0$, $I_5$, $I_{10}$, . . . and result from a picture calculation with a zero or near-zero motion vector with respect to the corresponding pictures read.

The signal 202 comprises a digital audio signal delayed by the delay required for the interpolation of the frames. To retain the synchronization between the sound and the pictures, the synchronization of the sound packets $A_0$-$A_{12}$ corresponding to the rate of the pictures read is preserved. Now, the number of sound samples is less than the number of samples making it possible to perform the digital/analog conversion at the normal sampling frequency.

An embodiment of the invention proposes to preserve the synchronization of the sound with the original picture rate by performing the digital/analog conversion at the sampling frequency. Without any complementary processing, the audio signal 203 would be obtained, consisting of the sound packets $A_0$-$A_{12}$ reproduced correctly but spaced apart by blanks. To fill in the blanks, a processing is performed to obtain a succession of transformed sound packets $A'_0$-$A'_{12}$ whose duration corresponds to the rate of pictures read but whose pitch corresponds to that of the packets $A_0$-$A_{12}$. The frequency content of the sound restored is therefore conserved. The transformed sound packets $A'_0$-$A'_{12}$ are then assembled together to form the signal 204. It is this signal 204 which is then converted into an analog signal for restitution.

Figure 5:
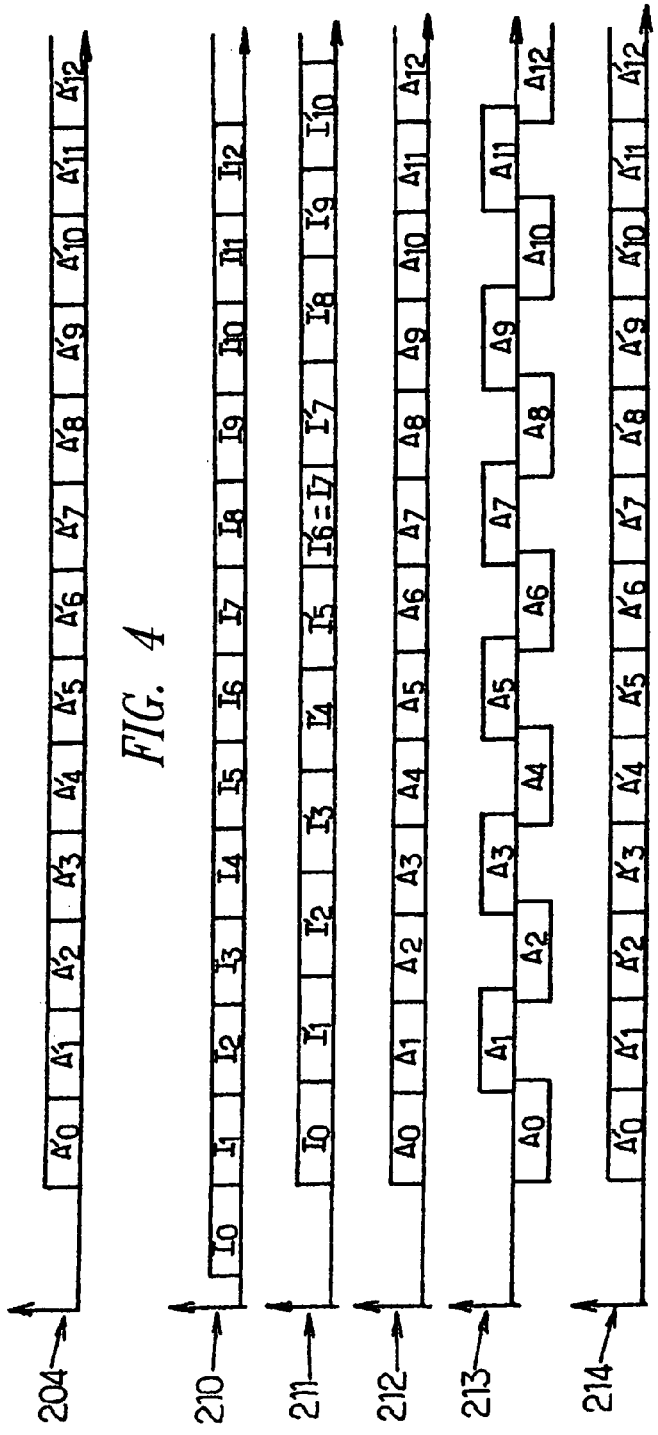

FIG. 5 shows example time charts corresponding to a data read carried out with a higher rate of pictures read than the rate of pictures to be restored, that is to say with a source that is momentarily too fast. The signal 210 corresponds to the digital video signal received by the shaping circuit 8, the pictures $I_0$-$I_{12}$ follow one another at a higher picture rate than the nominal picture rate. The signal 211 corresponds to the analog output signal, the pictures $I'_0$ to $I'_{10}$ follow one another at the nominal picture rate which corresponds for example to 50 frames per second.

In the example represented, the pictures $I_6$, $I_{12}$, . . . are deleted to take account of the overly fast rate of the source. To avoid jumps in the restored video signal, an interpolation is performed by the circuit 80.

The picture interpolation is carried out in the same way as previously. Each picture $I'_i$ is interpolated on the basis of two successive pictures $I_j$ and $I_{j+1}$ which correspond to the picture which precedes and to that which follows the picture $I'_i$. The picture processing causes a delay of the frames $I'_i$ with respect to the frames $I_j$. In FIG. 5, the frames $I'_0$, $I'_6$, . . . correspond respectively to frames $I_0$, $I_7$, . . . and result from a picture calculation with a zero or near-zero motion vector with respect to the corresponding pictures read.

The signal 212 corresponds to the digital audio signal delayed by the delay required for the interpolation of the frames. To retain synchronization between the sound and the pictures, the synchronization of the sound packets $A_0$-$A_{12}$ corresponding to the rate of the pictures read is preserved. Now, the number of sound samples is greater than the number of samples making it possible to perform the digital/analog conversion at the normal sampling frequency.

It is not possible to preserve the synchronization of the sound while preserving the same number of samples since the correctly restored sound packets $A_0$-$A_{12}$ overlap as shown in the example signal 213. A processing is performed to obtain a succession of transformed sound packets $A'_0$-$A'_{12}$ whose duration corresponds to the rate of pictures read but whose pitch corresponds to that of the packets $A_0$-$A_{12}$. The transformed sound packets $A'_0$-$A'_{12}$ are then assembled together to form the signal 214. It is this signal 214 which is then converted into an analog signal.

The transformation of the sound packets $A_0$-$A_{12}$ may be carried out in various ways, for example as illustrated by FIGS. 6 to 9. Whatever way is used, the fact that, over a very brief period, the sound is usually stationary, that is to say there is almost no alteration in its frequency content, especially its pitch, is exploited.

The digital audio signal is chopped into packets of samples in the chopping circuit 82. By way of example, the chopping may correspond to the packets of samples $A_0$-$A_{12}$ corresponding to the pictures read $I_0$-$I^{12}$. However, it is possible to carry out different choppings while preserving the synchronization of the chopped packets with respect to the pictures read. The modification of the chopped packets is carried out in the modification circuit 83. Next, the modified packets are assembled in the recombination circuit 84. The digital signal thus obtained is then converted into an analog signal so as to be provided to the sound amplification and restitution device. The modifications performed by the modification circuit 83 correspond to changes of timing of the audio signal with holding of the pitch.

Figure 6:
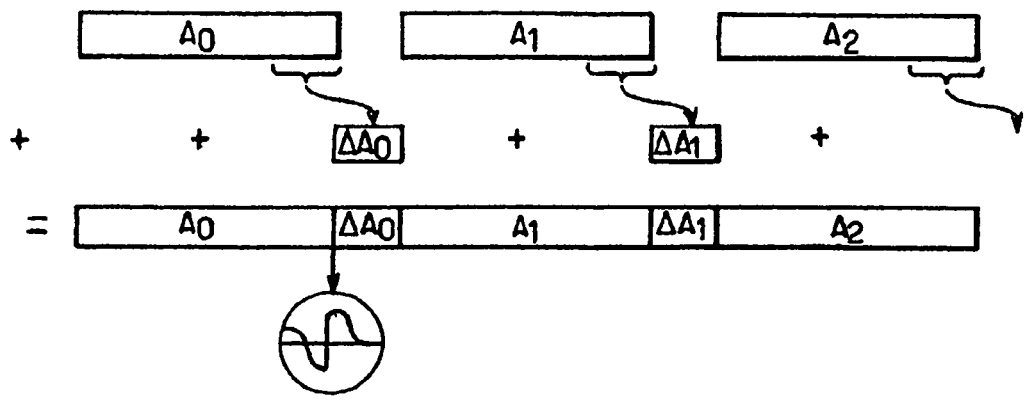
FIGS. 6 and 7 illustrate two examples of drop in timing of the audio signal.

FIG. 6 shows a first example of modifying packets of sound samples $A_0$-$A_2$, by slowing down the timing of the audio signal. A piece $\Delta A_0$ or $\Delta A_1$ of each packet $A_0$ or $A_1$ is copied. The piece $\Delta A_0$ or $\Delta A_1$ copied corresponds to the latest samples of the said packet $A_0$ or $A_1$. The number of samples copied corresponds to the number of samples missing between two successive packets $A_0$-$A_1$ or $A_1$-$A_2$. The packets $A_0$-$A_2$ are then assembled by intercalating the pieces $\Delta A_0$ and $\Delta A_1$, each piece copied being placed for example at the end of the packet from which it is extracted. A drawback to this modification technique stems from the signal breaks at the level of the joins between the packets and the pieces added. This break may add a perceptible noise to the audio signal.

Figure 7:
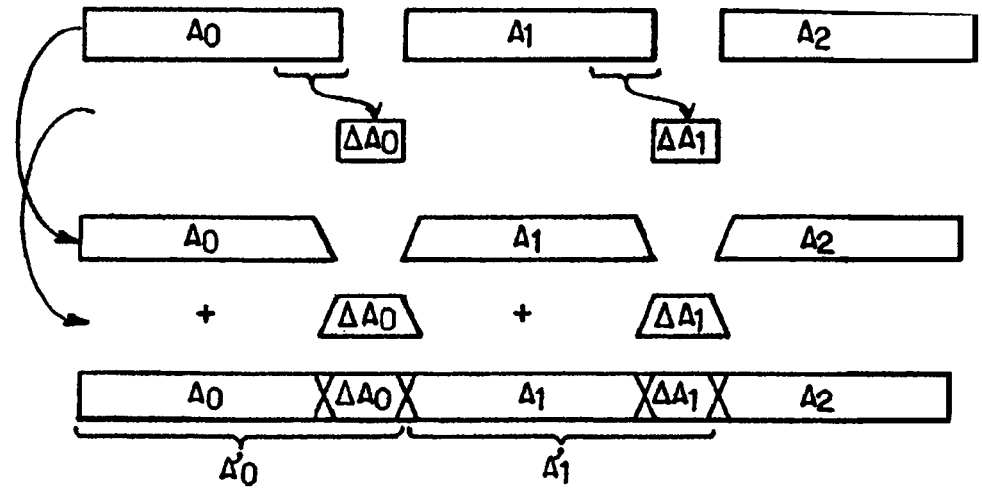

FIG. 7 shows an improvement of the procedure described with reference to FIG. 6. Pieces $\Delta A_0$ or $\Delta A_1$ are copied into the packets $A_0$ or $A_1$ but the number of samples of the pieces is slightly greater than the number of samples missing between two successive packets. Next, the packets $A_0$-$A_2$ and the pieces $\Delta A_0$-$\Delta A_1$ are attenuated at their ends by complementary functions over a number of samples corresponding to the samples added, for example five samples. The packets $A_0$-$A_2$ and the pieces $\Delta A_0$-$\Delta A_1$ are then summed at the level of the attenuated ends so as to effect a progressive mixing. A progressive mixing such as this reduces the impact of or eliminates the signal breaks related to the addition of a further piece.

Figure 8:
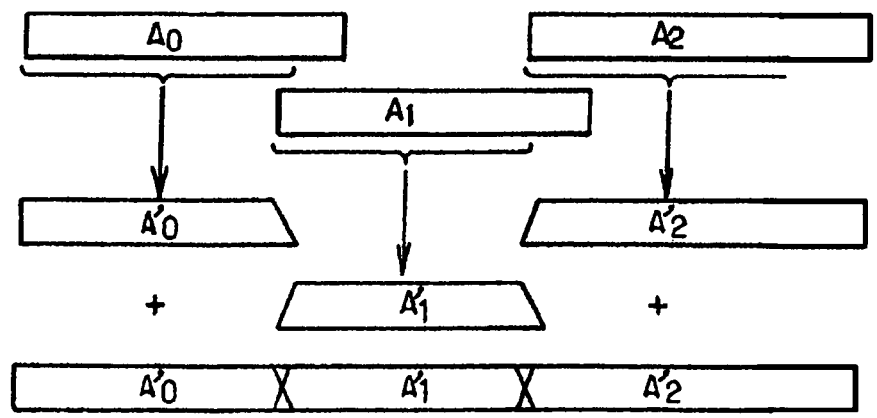
FIG. 8 illustrates an example of increase in timing of the audio signal.

FIG. 8 shows an example of accelerating the timing of the audio signal. The packets $A_0$-$A_2$ are truncated by a part of their samples so as to correspond to packets of smaller size which correspond to the number of desired samples in the time interval separating two packet starts. In order to perform a progressive mixing of the modified packets, the truncation performed affords a few further overlap samples. The overlap samples are attenuated progressively so as to carry out progressive mixing by the addition of two successive modified packets $A'_0$-$A'_1$ or $A'_1$-$A'_2$.

Figure 9:
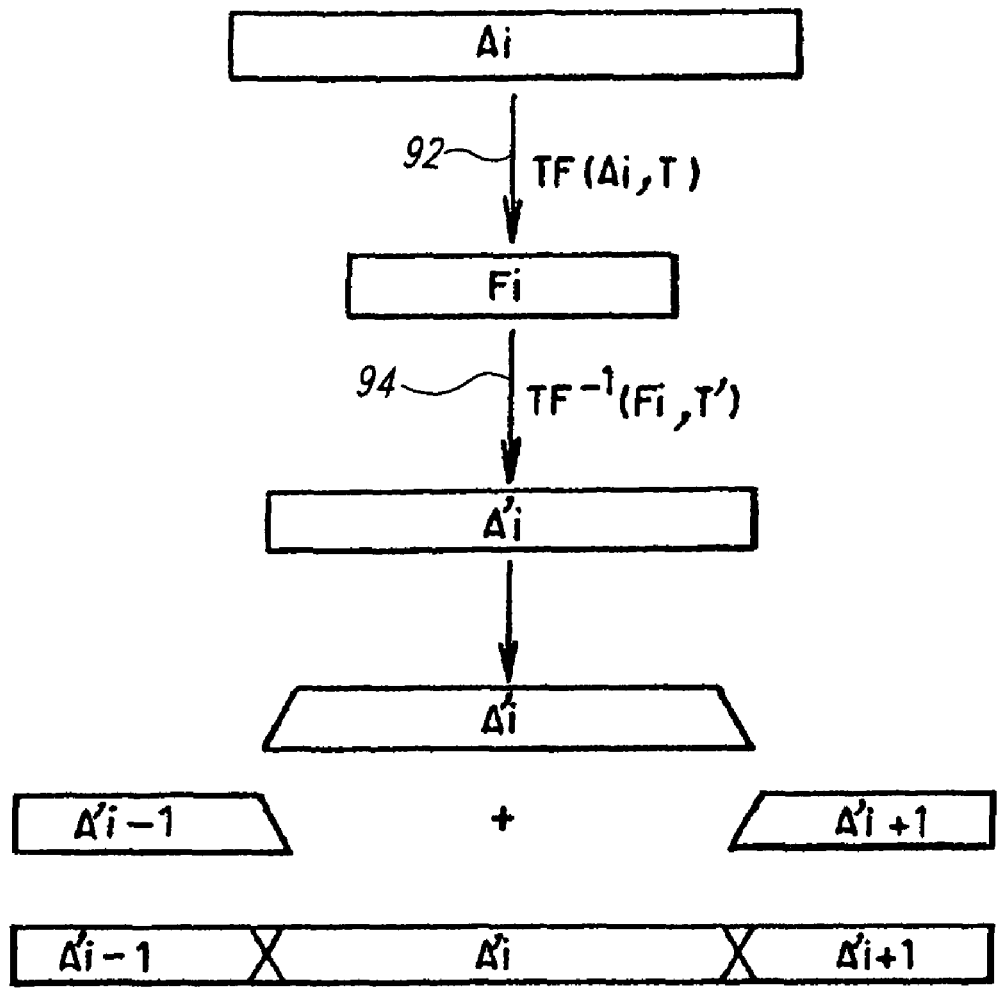
FIG. 9 illustrates another example of timing adjustment.

FIG. 9 shows a variant of modification of packets making it possible to effect a slowing down or an acceleration of the timing of the audio signal. A packet of samples $A_i$ of duration T undergoes a Fourier transformation 92. A transformed packet $F_i$ resulting from the Fourier transformation is then representative of the spectral composition of the sample packet $A_i$. An inverse Fourier transformation 94 is then carried out but on a target $A'_i$ which corresponds to a modified packet of a different duration T' and comprising a number of different samples. The modified packets $A'_{i-1}$ to $A'_{i+1}$ are then placed one after another by carrying out a progressive mixing at the levels of the packet junctions. The ratio T/T' corresponds to the ratio of the duration of a picture read to the duration of a picture at the nominal rate.

U.S. Pat. No. 5,952,596 issued to Kondo and entitled Method of Changing Tempo and Pitch of Audio by Digital Signal Processing may for example be consulted for other signal processing procedures making it possible to adjust the timing of an audio signal without modifying its pitch.

Regardless of the variation in rate of the pictures read, the picture synchronization performed by the picture processing circuit 80 facilitates determining the modifications to be performed at the level of the sound processing circuit 81. However, the control circuit 9 can assist the synchronization by signalling in advance the modifications to be performed on the audio signal as a function of the modifications performed at the level of the analog/digital converter 1.

The assembly consisting of the read/write circuit 3, the read head 4, the disk 5 and the motor 6 may be dimensioned so as to perform read and write operations more rapidly than the nominal read and/or write, speed. It is thus possible to perform a write of a data packet followed by the reading of another data packet with a data rate such that these two operations are performed in real time.

It is possible to use the disk 5 as read buffer when the analog signal at the input of the analog digital converter provides pictures at a rate higher than the nominal rate. The control circuit 9 measures the picture advance between the analog signal and the nominal rate. As long as this advance is positive, the shaping circuit 8 can operate as for normal reading of a disk since it is possible to read the data of the disk with a delay with respect to the writing of these data. When the advance of the analog signal becomes zero or negative, the control circuit 9 toggles the manner of operation of the shaping circuit 8 so as to compensate for the time drift of the signal read.

In another variant, an embodiment of the invention improves the restitution of an analog audio/video signal without necessarily including means of digital storage. This variant may be applied directly to the output of a video recorder. The analog/digital conversion circuit 1 is then linked directly to the shaping circuit 8. The processings performed on the sound and the pictures are of the same nature as those indicated above.

The term "computer-readable medium" as used herein refers to any medium that participates in providing instructions to a system or a processor for execution. Such a medium may take many forms, including but not limited to, non-volatile media, and volatile media. Non-volatile media includes, for example, hard, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM and an EEPROM, a FLASH-EEPROM, any other memory chip or cartridge, or any other medium from which a computer can read.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method, comprising:
   receiving a source signal having sound and pictures at a variable picture rate;
   calculating a sequence of pictures at a selected picture rate based on the pictures of the source signal;
   sampling the sound of the source signal so as to obtain a sampled sound signal having a selected number of sound samples per picture of the source signal; and
   restoring the calculated picture sequence at the selected picture rate and the sampled sound signal, in a manner synchronized with the reception of the source signal, wherein the sampled sound signal is restored substantially without change of pitch, with an adjustment of timing as a function of a ratio between the selected picture rate and the variable picture rate.

2. The method of claim 1 wherein the calculated picture sequence is restored by selectively deleting or repeating certain pictures of the said sequence, the deletion or repetition being controlled as a function of the ratio between the selected picture rate and the variable picture rate, with an interpolation between successive pictures.

3. The method of claim 1 wherein the picture sequence and the sampled sound signal are recorded on a digital recording medium during their synchronized restitution.

4. The method of claim 1 wherein the timing adjustment comprises the steps of:
   chopping the sampled sound signal into sequences of given length;
   modifying the length of each sequence so that a ratio between the modified sequence length and the sequence of given length is substantially equal to a ratio between the selected picture rate and the variable picture rate; and
   assembling an output sound signal on the basis of the modified sequences.

5. The method of claim 4 wherein modifying the length of a sequence of given length comprises a copying of a part of said sequence at the end of the sequence and the assembling of the output sound signal comprises a progressive mixing of two adjacent modified sequences.

6. The method of claim 4 wherein modifying the length of a sequence of given length comprises a deletion of a part of the sequence and the assembling of the output sound signal comprises a progressive mixing of two adjacent modified sequences.

7. The method of claim 4 in which the modifying of a sequence of given length comprises the steps of:
   carrying out a Fourier transform of said sequence to obtain a transformed sequence; and
   carrying out an inverse Fourier transform of the transformed sequence over a duration corresponding to a duration of the modified sequence so as to obtain the modified sequence; wherein the assembling of the output sound signal comprises a progressive mixing of two adjacent modified sequences.

8. A device for restoring sound and pictures at a selected picture rate comprising:
   means for receiving a source signal having sound and pictures at a variable picture rate;
   means for calculating pictures so as to produce a sequence of pictures at the selected picture rate on the basis of the pictures of the source signal;
   means for sampling the sound of the source signal so as to obtain a sampled sound signal having a selected number of sound samples per picture of the source signal;
   means for restoring the calculated picture sequence at the selected picture rate and the sampled sound signal, in a manner synchronized with the reception of the source signal; and
   means of timing adjustment so that the sampled sound signal is restored substantially without change of pitch, with a timing adjusted as a function of a ratio between the selected picture rate and the variable picture rate.

9. The device of claim 8 wherein the means for calculating pictures is configured to selectively delete or repeat certain pictures of the sequence, the deletion or repetition being controlled as a function of the ratio between the selected picture rate and the variable picture rate, with an interpolation between successive pictures.

10. A digital video player/recorder comprising:
means for receiving a source signal having sound and pictures at a variable picture rate;
means for calculating pictures so as to produce a sequence of pictures at the selected picture rate on the basis of the pictures of the source signal;
means for sampling the sound of the source signal so as to obtain a sampled sound signal having a selected number of sound samples per picture of the source signal;
means of recording the calculated picture sequence and the sampled sound signal on a digital recording medium;
means of audio and video restitution, that can be activated in a simultaneous recording and restitution mode so as to restore the calculated picture sequence at the selected picture rate and the sampled sound signal in a manner synchronized with the reception of the source signal; and
means of timing adjustment activated in the simultaneous recording and restitution mode so that the sampled sound signal is restored substantially without change of pitch, with a timing adjusted as a function of a ratio between the selected picture rate and the variable picture rate.

11. The digital video player/recorder of claim 10 wherein the means of audio/video restitution comprises:
a chopper;
a length modifier; and
a combiner.

12. The digital video player/recorder of claim 10 wherein the means for calculating pictures is configured to selectively delete or repeat certain pictures of the sequence, the deletion or repetition being controlled as a function of the ratio between the selected picture rate and the variable picture rate, with an interpolation between successive pictures.

13. A device for restoring sound and pictures at a selected picture rate comprising:
a decoder configured to receive a source signal having sound and pictures at a variable picture rate and to produce a sequence of pictures at the selected picture rate on the basis of the pictures of the source signal and a sampled sound signal having a selected number of sound samples per picture of the source signal; and
a synchronizer configured to synchronize the sequence of pictures at the selected picture rate and the sampled sound signal with the source signal so that the sampled sound signal is restored substantially without change of pitch, with a timing adjusted as a function of a ratio between the selected picture rate and the variable picture rate.

14. The device of claim 13 wherein the synchronizer is configured to chop the sampled sound signal into sequences of a selected length, copy a portion of a first sequence at an end of the first sequence, apply an attenuation function to the end of the first segment, apply a complementary attenuation function to an end of the copied portion of the first sequence, and progressively mix the first sequence and the copied portion of the first sequence.

15. The device of claim 13 wherein the synchronizer is configured to chop the sampled sound signal into sequences of a selected length and modify a length of a first sequence to obtain a first modified sequence by, carrying out a Fourier transform of the first sequence to obtain a transformed sequence, carrying out an inverse Fourier transform of the transformed sequence over a duration corresponding to a duration of the first modified sequence to obtain the first modified sequence.

16. The device of claim 13 wherein the decoder is configured to selectively delete or repeat certain pictures of the sequence, the deletion or repetition being controlled as a function of the ratio between the selected picture rate and the variable picture rate, with an interpolation between successive pictures.

17. A digital video player/recorder comprising:
signal processing circuitry configured to:
receive a source signal having sound and pictures at a variable picture rate;
calculate pictures so as to produce a sequence of pictures at the selected picture rate on the basis of the pictures of the source signal;
sample the sound of the source signal so as to obtain a sampled sound signal having a selected number of sound samples per picture of the source signal; and
simultaneously control recording of the calculated picture sequence and the sampled sound signal on a digital recording medium and restoration of the calculated picture sequence and the sampled sound signal in a manner synchronized with the reception of the source signal substantially without change of pitch, with a timing adjusted as a function of a ratio between the selected picture rate and the variable picture rate; and
a digital storage assembly.

18. The digital video player/recorder of claim 17 wherein the signal processing circuitry comprises:
a chopper;
a length modifier; and
a combiner.

19. The digital video player/recorder of claim 18 wherein the chopper is configured to chop the sampled sound signal into sequences of a given length, the length modifier is configured to modify a sequence by copying a part of the sequence at the end of the sequence, and the combiner is configured to progressive mix two adjacent modified sequences.

20. The digital video player/encoder of claim 18 wherein the chopper is configured to chop the sampled sound signal into sequences of a given length, the length modifier is configured to modify the length of a sequence by deleting of a part of the sequence and the combiner is configured to progressively mix two adjacent modified sequences.

21. The digital video player/encoder of claim 17 wherein the signal processing circuitry is configured to selectively delete or repeat certain pictures of the sequence, the deletion or repetition being controlled as a function of the ratio between the selected picture rate and the variable picture rate, with an interpolation between successive pictures.

* * * * *